United States Patent
Kuang et al.

(10) Patent No.: US 8,959,390 B2
(45) Date of Patent: Feb. 17, 2015

(54) DIRECTORY-LEVEL RAID

(71) Applicant: Facebook, Inc., Menlo Park, CA (US)

(72) Inventors: Hairong Kuang, San Jose, CA (US); Weiyan Wang, Mountain View, CA (US); Dikang Gu, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 215 days.

(21) Appl. No.: 13/674,670

(22) Filed: Nov. 12, 2012

(65) Prior Publication Data

US 2014/0136889 A1    May 15, 2014

(51) Int. Cl.
*G06F 11/00*    (2006.01)
*G06F 11/14*    (2006.01)

(52) U.S. Cl.
CPC .................. *G06F 11/1412* (2013.01)
USPC ........................ 714/6.24; 714/6.22

(58) Field of Classification Search
CPC .................................................. G06F 11/1412
USPC ................................................ 714/6.24, 6.22
See application file for complete search history.

(56) References Cited

U.S. PATENT DOCUMENTS

| 6,675,176 B1 * | 1/2004 | Shinkai et al. ............... 707/823 |
| 7,681,072 B1 * | 3/2010 | Gibson et al. ................ 714/6.22 |
| 2003/0056139 A1 * | 3/2003 | Murray et al. ...................... 714/4 |

* cited by examiner

*Primary Examiner* — Yolanda L Wilson
(74) *Attorney, Agent, or Firm* — Perkins Coie LLP

(57) ABSTRACT

A method and system for reducing replication factor in a file system are provided. In some embodiments, two or more requested files may be grouped together under a leaf directory for RAID process. All data under the directory are grouped into one or more data stripes, each of which comprises a plurality of data blocks. One or more parity data blocks may be generated for each data stripe according to a computing algorithm, such as an exclusive OR (XOR) code or a Reed-Solomon (RS) code. Parity blocks corresponding to the one or more data stripes are concatenated into one parity file. Data blocks of the two or more requested files and their corresponding parity blocks are stored in separate partitions and/or separate storage drives of the file system.

20 Claims, 7 Drawing Sheets

DIRECTORY-LEVEL RAID

FIELD OF INVENTION

Various embodiments of the present disclosure generally relate to computing systems, and in particular to data storage within such computing systems.

BACKGROUND

The explosion of social networking has led to extensive sharing of information including items such as videos, photos, blogs, links, etc. In order to support the demand on information sharing and data storage, more and more physical storage devices are incorporated into the existing data storage systems. Data stored on each physical storage device may represent significant memories or assets for many users. However, physical storage devices may fail randomly or after a certain amount of usage. Data losses can be costly in terms of wasted time and loss of good will from users.

One solution is to implement a Redundant Array of Independent Disks (RAID). In a RAID system, data is replicated into two or more copies across independent disks, collectively referred to as an array. A RAID controller adds parity data to the original data before storing it across the array. The parity data is used to recover the original data in the event of disk failures.

SUMMARY

Embodiments of the present disclosure provide a variety of methods, systems and paradigms for reducing replication factor in a file system. For example, instead of performing file level RAID, the present teach provides for directory-level RAID. In some embodiments, two or more requested files may be grouped together under a leaf directory for RAID process. All data under the directory are grouped into one or more data stripes, each of which comprises a plurality of data blocks. One or more parity data blocks may be generated for each data stripe according to a computing algorithm, such as an exclusive OR (XOR) code or a Reed-Solomon (RS) code. All parity blocks corresponding to the two or more requested files are concatenated into one parity file. Data blocks of files in the directory and corresponding parity blocks may be written to separate partitions and/or separate storage drives of the file system.

When a specific parity block or a specific data block of a data strip in the leaf directory is missing or corrupted, the parity block or the specific data block can be reconstructed from the remaining parity block(s) and data blocks stored in the file system. If a specific data block of a data stripe is missing, the specific data block can be reconstructed from the remaining data blocks in the specific data stripe and parity blocks corresponding to the specific data stripe. If a specific parity block is missing, the specific parity block can be reconstructed from the specific data stripe corresponding to the specific parity block and remaining parity block(s) corresponding to the specific data stripe.

In some embodiments, an original checksum may be computed when parity blocks are generated for files under a leaf directory. A second checksum is computed when a specific data block or a specific parity block is reconstructed based on the remaining data blocks in the data stripe and remaining parity blocks corresponding to the data stripe. The reconstructed data block or the reconstructed parity block may be rewritten to the file system only if the value of the second checksum matches the value of the original checksum.

In some embodiments, the number of data blocks in each data stripe may be predetermined or defined by RAID algorithms. Data blocks of a specific data stripe may have the same or different sizes of data. In some embodiments, the size of parity blocks corresponding to the specific data stripe may be predetermined or set to the maximum size of data blocks in the specific data stripe.

While multiple embodiments are disclosed, still other embodiments of the present disclosure will become apparent to those skilled in the art from the following detailed description, which shows and describes illustrative embodiments of the invention. As will be realized, the invention is capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
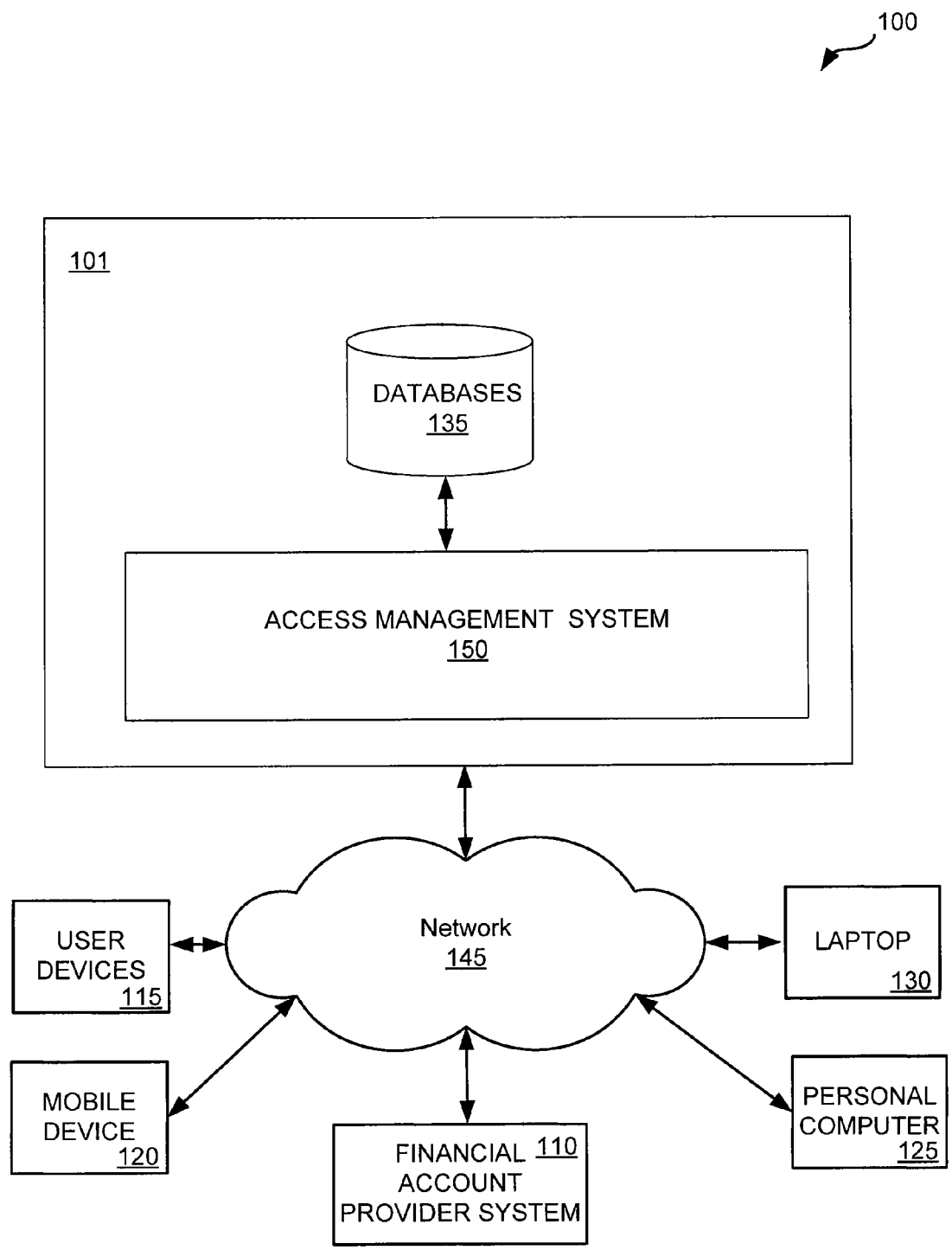
FIG. 1 illustrates an example of a system environment 100 for a social networking system 101 in which some embodiments of the present disclosure may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The following description and drawings are illustrative and are not to be construed as limiting. Numerous specific details are described to provide a thorough understanding of the disclosure. However, in certain instances, well-known details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Various embodiments of the present disclosure generally relate to directory-level RAID. More specifically, various embodiments of the present invention relate systems and methods for reducing replication factor by implementing directory-level RAID in a file system. Traditionally, file systems only support file-level RAID. For each file, a separate parity file is generated during RAID process. Replication ratios of these systems could be significantly higher than theoretical ratios. In contrast, various embodiments of the present disclosure support directory-level RAID. Requested files are grouped under a leaf directory. One parity file is generated for all files under the leaf directory during RAID process. Therefore, the last stripe problem can be greatly reduced, which results in improved replication ratios.

While examples described herein refer to a social networking system, the descriptions should not be taken as limiting the scope of the present disclosure. Various alternatives, modifications, and equivalents will be apparent to those skilled in the art without varying from the spirit of the invention. For example, directory-level RAID may be implemented in any computing system organizing collected data. For another example, directory-level RAID may be implemented in any computing system having a database management system (DBMS). The DBMS may include well known DBMS, such as, FoxPro, IBM DB2, Linter, Microsoft SQL Server, MySQL, Oracle, PostgreSQL and SQLite etc.

FIG. 1 illustrates an example of a system environment 100 for a social networking system 101 in which some embodiments of the present disclosure may be utilized. The system environment 100 shown in FIG. 1 includes a social networking system 101, user devices 115, a financial account provider system 110 and a network 145. In other embodiments, the system environment 100 may include different and/or additional components than those shown by FIG. 1.

The social networking system 101, further described below in conjunction with FIG. 2, comprises one or more computing devices storing user profiles associated with users and/or other objects as well as connections between users and other users and/or objects, an access management system 150 and a plurality of databases, such as database 135. Users can store data (i.e., photos, videos, messages, electronic documents, e-mails, records) and related analytics (i.e., usage analytics) in the social networking system 101. The data can be submitted through various user devices 115 and/or other devices to allow the data to be stored on database 135. As illustrated in FIG. 1, these devices and tools may use network 145 to submit and retrieve information from the social networking system 101.

In some embodiments, users join the social networking system 101 and then add connections to other users or objects of the social networking system to which they desire to be connected. As further described below in conjunction with FIG. 1, users of the social networking system 101 may be individuals or entities such as businesses, organizations, universities and manufacturers. The social networking system 101 allows its users to interact with each other as well as with other objects maintained by the social networking system 101. In some embodiments, the social networking system 101 allows users to interact with third-party websites and the financial account provider 110.

Based on stored data about users, objects and connections between users and/or objects, the social networking system 101 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 101 modifies edges connecting the various nodes to reflect the interactions.

User devices 115 can be any computing device capable of receiving user input as well as transmitting and/or receiving data via the network 145. In one embodiment, user devices 115 are a conventional computer system, such as a desktop 125 or laptop computer 130. In another embodiment, user devices 115 may be mobile device 120 having computer functionality, such as a personal digital assistant (PDA), mobile telephone, smart-phone or similar device. User devices 115 are configured to communicate with access management system 150, and/or the financial account provider via the network 145. In one embodiment, a user device executes an application allowing a user of the user devices to interact with the access management system 150. For example, user devices 115 can execute a browser application to enable interaction between the user devices 115 and access management system 150 via the network 145. In another embodiment, user devices 115 interact with access management system 150 through an application programming interface (API) that runs on the native operating system of the user device 208, such as IOS® or ANDROID™.

User devices 115 can be configured to communicate via the network 145, which may comprise any combination of local area and/or wide area networks, using both wired and wireless communication systems. In one embodiment, the network 145 may include one or more networks of any type (i.e., wired and/or wireless). For example, the network 145 may include a wide area network (WAN), a local area network (LAN), an ad hoc network, the Internet, an intranet, a personal area network (PAN), a storage area network, a home area network, a campus area network, a backbone network, a metropolitan area network (MAN), an enterprise private network, a virtual private network, a virtual network, a cellular telephone network, a satellite network, a telephone network (i.e., a Public Switched Telephone Network (PSTN)), an internet-work or a combination of two or more of these. The network 145 may use technologies such as Ethernet as defined by IEEE 802.XX, 4G Long Term Evolution (LTE), 3rd Generation Partnership Project (3GPP), Global System for Mobile Communications (GSM), Enhanced Data Rates for GSM Evolution (EDGE), Universal Mobile Telecommunications System (UMTS), High Speed Packet Access (HSPA), Code Division Multiple Access (CDMA), Worldwide Interoperability for Microwave Access (WiMAX), International Mobile Telecommunications-Advanced (IMT-Advanced) or a combination of two or more of these.

The networking protocols used in the network 145 may include Transmission Control Protocol (TCP) and Internet Protocol (IP), Internetwork Packet Exchange/Sequenced Packet Exchange (IPX/SPX), User Datagram Protocol (UDP), Internet Control Message Protocol (ICMP), Hypertext Transfer Protocol (HTTP), Post Office Protocol (POP3), File Transfer Protocol (FTP), Internet Message Access Protocol (IMAP), X.25, AX.25, AppleTalk or a combination of two or more of these. Data exchanged over the network 145 may be represented using formats such as HTML, SGML-based HTML and/or XML-based HTML etc.

Figure 2:
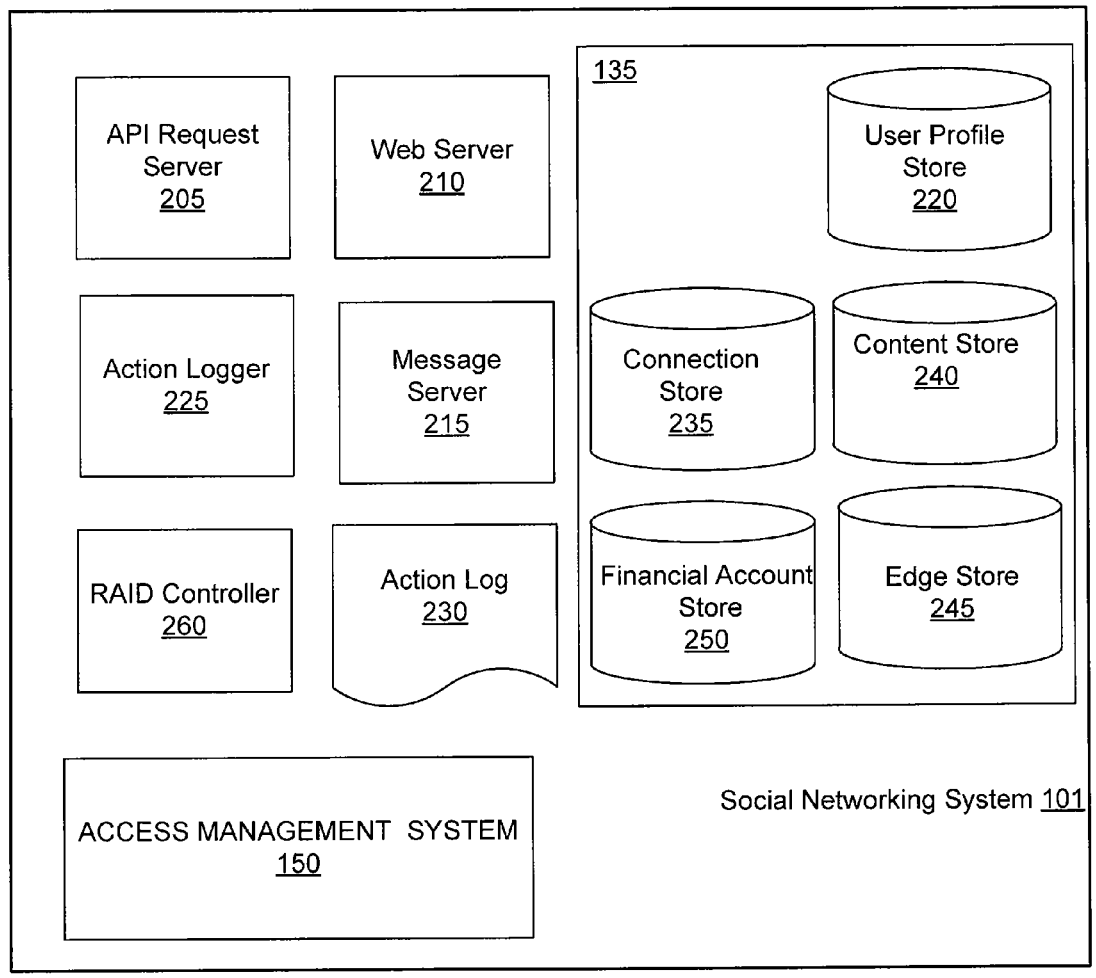
FIG. 2 is a block diagram of a system architecture of the social networking system 101 in accordance with one or more embodiments of the present disclosure.

FIG. 2 is a block diagram of system architecture of the social networking system 101, in accordance with one or more embodiments of the present disclosure. The social networking system 101 shown by FIG. 2 includes an access management system 150, an action logger 225, an API request server 205, a message server 215, a web server 210, an action log 230 and database 135 (i.e., a user profile store 220, a content store 240, an edge store 245, a financial account store 250 and a connection store 235). In some embodiments, the social networking system 101 may include additional, fewer or different modules for various applications. Conventional components such as network interfaces, security mechanisms, load balancers, failover servers, management and network operations consoles, and the like are not shown so as to not obscure the details of the system architecture.

Each user of the social networking system 101 is associated with a user profile, which is stored in the user profile store 220. A user profile includes declarative information about the user that was explicitly shared by the user, and may also include profile information inferred by the social networking system 101. In one embodiment, a user profile includes multiple data fields, each data field describing one or more attributes of the corresponding user of the social networking system 101. The user profile information stored in user profile store 220 describes the users of the social networking system 104, including biographic, demographic and other types of descriptive information, such as work experience, educational history, gender, hobbies or preferences, location and the like. A user profile may also store other information provided by the user, for example, images, videos or other objects. In certain embodiments, images of users may be tagged with identification information on users of the social networking system 101 displayed in an image. A user profile in the user profile store 220 may also maintain references to actions by the corresponding user performed on content items in the content store 240 and stored in the edge store 245.

As further described below, a user profile may be associated with one or more financial accounts, allowing the user profile to include data retrieved from or derived from a financial account. A user may specify one or more privacy settings, which are stored in the user profile, that limit information from a financial account that the social networking system 101 is permitted to access. For example, a privacy setting limits the social networking system 101 to accessing the transaction history of the financial account and not the current account balance. As another example, a privacy setting limits the social networking system 101 to a subset of the transaction history of the financial account, allowing the social networking system 101 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 101. In one embodiment, information from the financial account is stored in the user profile store 220. In other embodiments, it may be stored in the financial account store 250, which is further described below.

The content store 240 stores content items associated with a user profile, such as images, videos or audio files. Content items from the content store 240 may be displayed when a user profile is viewed or when other content associated with the user profile is viewed. For example, displayed content items may show images or video associated with a user profile or show text describing a user's status. Additionally, other content items may facilitate user engagement by encouraging a user to expand his or her connections to other users, to invite new users to the system or to increase interaction with the social network system by displaying content related to users, objects, activities or functionalities of the social networking system 101. Examples of social networking content items include suggested connections or suggestions to perform other actions, media provided to, or maintained by, the social networking system 101 (e.g., pictures or videos), status messages or links posted by users to the social networking system, events, groups, pages (e.g., representing an organization or commercial entity), and any other content provided by, or accessible via, the social networking system.

The content store 240 also includes one or more pages associated with entities having user profiles in the user profile store 220. An entity is a non-individual user of the social networking system 101, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 240, allowing social networking system users to more easily interact with the vendor via the social networking system 101. A vendor identifier is associated with a vendor's page, allowing the social networking system 101 to identify the vendor and/or to retrieve additional information about the vendor from the user profile store 220, the action log 230 or from any other suitable source using the vendor identifier. In some embodiments, the content store 240 may also store one or more targeting criteria associated with stored objects and identifying one or more characteristics of a user to which the object is eligible to be presented.

The action logger 225 receives communications about user actions on and/or off the social networking system 101, populating the action log 230 with information about user actions. Such actions may include, for example, adding a connection to another user, sending a message to another user, uploading an image, reading a message from another user, viewing content associated with another user and attending an event posted by another user, among others. In some embodiments, the action logger 225 receives, subject to one or more privacy settings, transaction information from a financial account associated with a user and identifies user actions from the transaction information. For example, the action logger 225 retrieves vendor identifiers from the financial account's transaction history and identifies an object, such as a page, in the social networking system associated with the vendor identifier. This allows the action logger 225 to identify a user's purchases of products or services that are associated with a page, or another object, in the content store 240. In addition, a number of actions described in connection with other objects are directed at particular users, so these actions are associated with those users as well. These actions are stored in the action log 230.

The action log 230 may be used by the social networking system 220 to track user actions on the social networking system 101, as well as external website that communicate information to the social networking system 101. Users may interact with various objects on the social networking system 101, including commenting on posts, sharing links, checking-in to physical locations via a mobile device, accessing content items in a sequence or other interactions. Information describing these actions is stored in the action log 230. Additional examples of interactions with objects on the social networking system 101 included in the action log 230 include commenting on a photo album, communications between users, becoming a fan of a musician, adding an event to a calendar, joining a group, becoming a fan of a brand page, creating an event, authorizing an application, using an application and engaging in a transaction. Additionally, the action log 230 records a user's interactions with advertisements on the social networking system 101 as well as other applications operating on the social networking system 101. In some embodiments, data from the action log 230 is used to infer interests or preferences of the user, augmenting the interests included in the user profile and allowing a more complete understanding of user preferences.

The action log 230 may also store user actions taken on external websites and/or determined from a financial account associated with the user. For example, an e-commerce website that primarily sells sporting equipment at bargain prices may recognize a user of a social networking system 101 through social plug-ins that enable the e-commerce website to identify the user of the social networking system 101. Because users of the social networking system 101 are uniquely identifiable, e-commerce websites, such as this sporting equipment retailer, may use the information about these users as they visit their websites. The action log 230 records data about these users, including webpage viewing histories, advertisements that were engaged, purchases made and other patterns from shopping and buying. Actions identified by the action logger 225 from the transaction history of a financial account associated with the user allow the action log 230 to record further information about additional types of user actions. In some embodiments, content of the action log 230 may be stored in the database 135.

In one embodiment, an edge store 245 stores the information describing connections between users and other objects on the social networking system 101 in edge objects. Some edges may be defined by users, allowing users to specify their relationships with other users. For example, users may generate edges with other users that parallel the users' real-life relationships, such as friends, co-workers, partners and so forth. Other edges are generated when users interact with objects in the social networking system 101, such as expressing interest in a page on the social networking system, sharing a link with other users of the social networking system, and commenting on posts made by other users of the social networking system. The edge store 245 stores edge objects that include information about the edge, such as affinity scores for objects, interests and other users. Affinity scores may be computed by the social networking system 101 over time to approximate a user's affinity for an object, interest and other users in the social networking system 101 based on the actions performed by the user. Multiple interactions between a user and a specific object may be stored in one edge object in the edge store 245, in one embodiment. In some embodiments, connections between users may be stored in the user profile store 220, or the user profile store 220 may access the edge store 245 to determine connections between users.

In one embodiment, the database 135 may be defined as a computer system for serving data to users. The database 135 may be a computer system as described in FIG. 7. In some embodiments, the database 135 may include, for example, a file system, a Hadoop machine, an HBase, a file server machine or a computer connected to multiple storage devices.

The database 135 may contain any type of computer writable and readable storage media. By way of example, the storage media may include a volatile memory (i.e., a random access memory (RAM) etc.), a non-volatile memory (i.e., a flash memory, a read-only memory (ROM) etc.), a hard disk, an optical disc, a floppy disk, a magnetic tape, a solid-state drive (SSD), a secure digital (SD) card, or any suitable computer-readable storage medium or a combination of two or more of these.

Figure 3A:
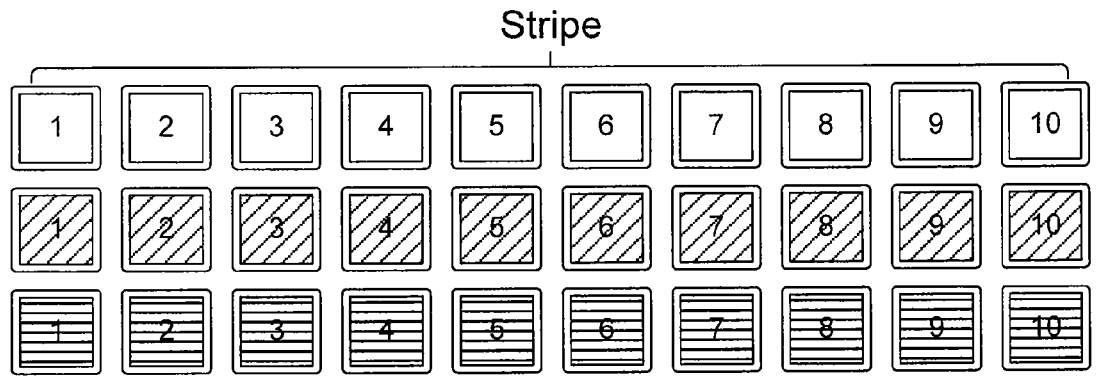
FIGS. 3A-3C illustrate data storage examples of providing redundant information associated with each data block to improve fault tolerance.
Figure 3B:
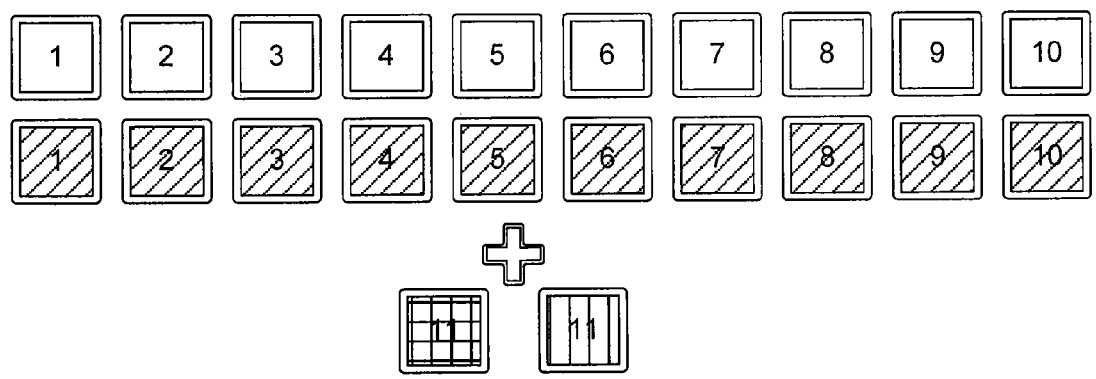
Figure 3C:
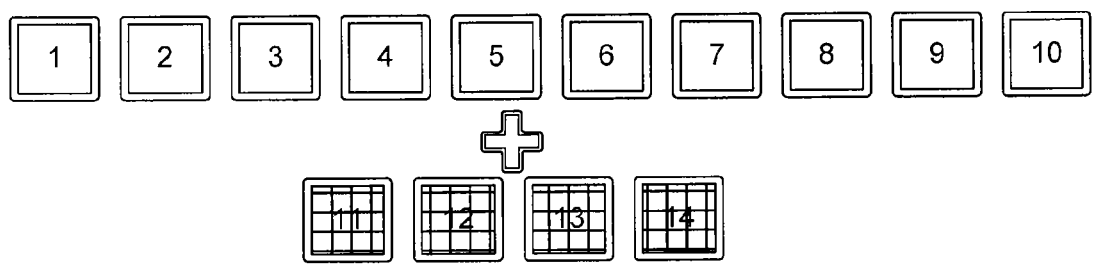

FIGS. 3A-3C illustrate data storage examples of providing redundant information associated with each data block to improve fault tolerance. Each database file is divided into data stripes that span over a plurality of storage devices in the database 135. Each data stripe consists of a plurality of data blocks. The number of data blocks in each data stripe can be a fixed number or a number defined by RAID algorithms, for example, 10 data blocks per data stripe. In one embodiment, data blocks may be replicated one or more times and stored in separate partitions or storage devices in the database 135. FIG. 3A illustrates a scenario that data blocks 1-10 are replicated two times and stored in the database 135.

In one embodiment, data blocks are stored in a RAID array. A parity file may be generated for each file in the RAID array by using well-known computing algorithms, for example, an exclusive OR (XOR) code or a Reed-Solomon (RS) code. The parity file consists of one or more parity blocks. Each data stripe may correspond to one or more parity blocks in the parity file. For example, one or more parity blocks are computed with a RAID controller 260 by XORing all data blocks in a data stripe to generate the one or more parity blocks corresponding to the data blocks of the data stripe. In some implementations, the RS code treats each data block as a number between 0 and $2^w-1$, and operates on these numbers with Galois Field arithmetic ($GF(2^w)$).

FIG. 3B illustrates an example of generating parity blocks of a data file by using an XOR code. The data file consists of one data stripe having 10 data blocks and is replicated once. One parity block is generated for each data stripe. In this example, the replication number of the file is 2 with a replication factor, 22/10=2.2. FIG. 3C illustrates another example of generating parity blocks of a data file by using an RS code. The data consists of one data stripe having 10 data blocks with no additional replication. Four parity blocks are generated for the data stripe. In this example, the replication number of the file is 1 with a replication factor, 14/10=1.4.

Figures 4A, 4B, 4C:
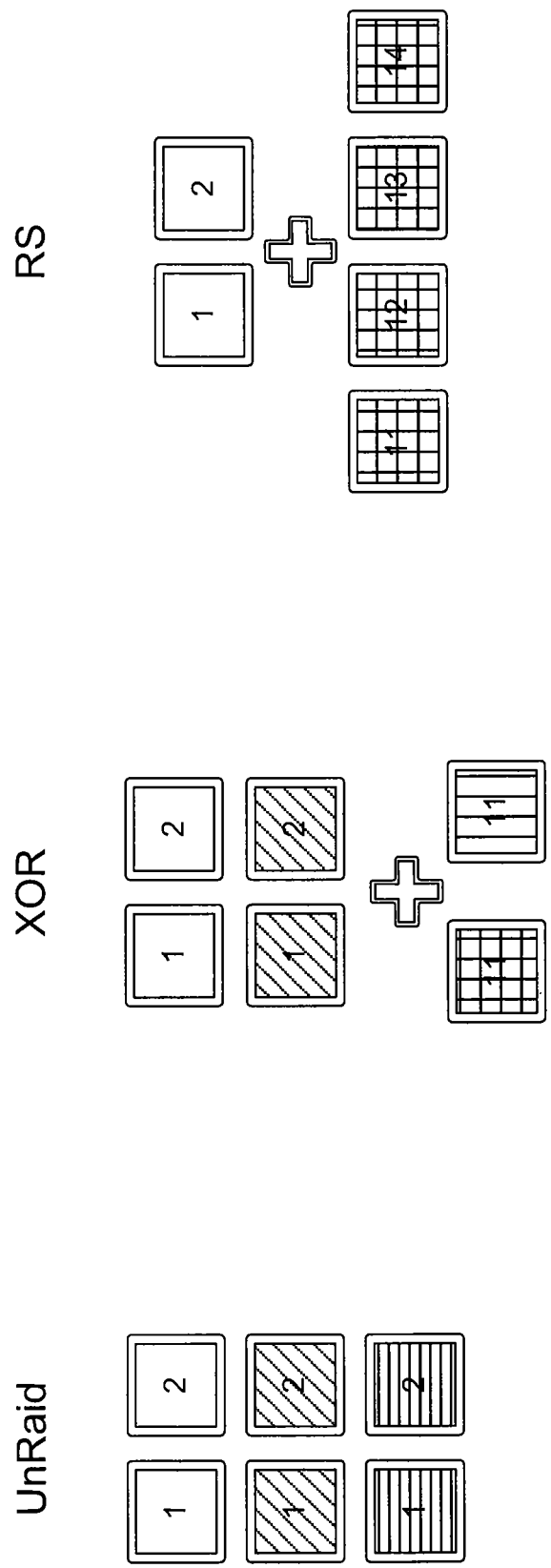
FIGS. 4A-4C illustrate data storage examples when the number of data blocks in each data stripe, as illustrated in FIGS. 3A-3C, decreases from 10 to 2.

For a given RAID code, the replication factor of a file may depend on a variety of factors, which include size of the file, size of each stripe, size of each data block, the number of parity blocks for each stripe and/or the replication number. If size of each stripe, size of each data block and the number of parity blocks are fixed, the replication factor may be determined by the size of each file. FIGS. 4A-4C illustrate data storage examples when the number of data blocks in each data stripe, as illustrated in FIGS. 3A-3C, decreases from 10 to 2. In FIG. 4A, the replication factor of unRAID replication remains unchanged. In FIGS. 4B and 4C, the replication factors with XOR RAID and RS RAID have increased to 6/2=3 from their initial values 2.2 and 1.4, respectively. In these scenarios, there is no storage savings between mirroring replication versus RAID replication with either an XOR code or an RS code.

In some embodiments, a RAID controller 260 may group two or more requested files under one leaf directory to reduce replication factor. The files may include texts, videos, audios, word documents, spreadsheets, user profiles, information of connections and interactions between users and/or files with a variety of sizes. The two or more files under the leaf directory are grouped into one or more data stripes and then RAIDed together to generate one parity file using algorithms such as XOR or RS. Each data stripe may consist of a number of data blocks, for example, 10 data blocks etc., with the same or different sizes of data. The parity file may consist of one or more parity blocks. The number of parity blocks corresponding to each data stripe may be a predetermined number according to a specific RAID algorithm or a user-defined parameter. The size of parity blocks may be predetermined or defined by RAID algorithms. In some embodiments, each parity block has the same size as each data block. In some embodiments, the size of parity blocks may depend on the size of files in the leaf directory. For example, if every file in the directory is small and has a partial data block, the size of parity blocks may be set to the maximum size of all partial blocks.

In some embodiments, individual file(s) in the leaf directory may be selected, modified and/or deleted separately. It should be appreciated that the leaf directory structure is provided for the sake of clarity. A non-leaf directory may also be used to group two or more files for RAID. In some implementations, all files may be grouped in a single level directory.

In some embodiments, RAID controller 260 and/or access management system 150 may monitor access statistics of each file and categorize files into a plurality of groups according to access frequencies. Files with access frequencies below a predetermined level may be grouped into a leaf directory for a directory-level RAID. In some implementations, the RAID controller 260 may include a dedicated RAID controller chip to improve RAID throughput. In some implementations, the RAID controller 260 may include a standard controller chip with special firmware and drivers.

In some embodiments, RAID data blocks (i.e., parity blocks and data blocks) of the leaf directory may be written to separate partitions and/or span over separate storage devices of the database 135. When one or more RAID data blocks get lost due to disk failure, power failure, system crash and/or virus attack, the lost one or more RAID data blocks may be restored by copying replicated data blocks stored in other partitions and/or storage devices, and/or reconstructed by computing remaining data and parity blocks of the directory stored in separate partitions and/or separate storage devices. In some implementations, the RS code reconstructs lost one or more RAID data blocks by deleting rows in a Vandermode matrix, which corresponds to the lost one or more RAID data blocks, inverting the matrix, and multiplying the inverse by the surviving data blocks.

In some embodiments, when the structure of the leaf directory is changed, files in the new leaf directory may be RAIDed together to generate new RAID data blocks (i.e., parity blocks and data blocks). RAID data blocks of the old leaf directory are then removed from the database 135 when new RAID data blocks are written to the database 135.

In some embodiments, the RAID controller 260 may be configured to calculate a checksum during a RAID process. For example, a checksum may be calculated each time a leaf directory is RAIDed and stored to the database 135. The checksum is written to the database 135 together with data blocks and parity blocks of data in the leaf directory. In the event one or more data blocks or parity blocks of data in the leaf directory are reconstructed, the RAID controller 260 or the access management system 150 may calculate the checksum again and compare it to the checksum value originally calculated and stored in the database 135. If two checksum values match, reconstruction process is successful. If two checksum values are different, the one or more data blocks or parity blocks is not reconstructed properly. The RAID controller 260 or the access management system 150 may select other available algorithms to recover the one or more data blocks or parity blocks.

Figures 5A, 5B:
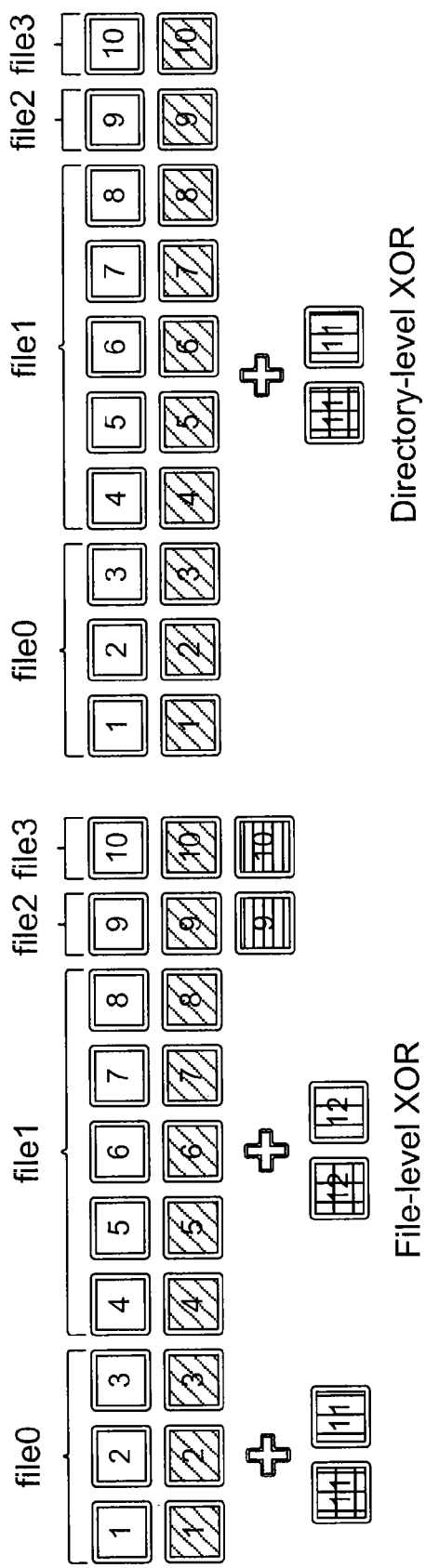
FIGS. 5A and 5B show examples of RAID with a file-level XOR and a directory-level XOR, respectively, in accordance with various embodiments of the present disclosure.

FIGS. 5A and 5B show examples of RAID with a file-level XOR and a directory-level XOR, respectively, in accordance with various embodiments of the present disclosure. In FIG. 5A, files 0 through 3 are separately RAIDed with XOR code, which results in four separate parity files with a total of 6 parity blocks. In FIG. 5B, files 0 through 3 are first grouped together under a leaf directory. All data from files 0 through 3 are grouped into one data stripe with 10 data blocks. Only 1 parity file with 2 parity blocks is required. In this scenario, 4 parity blocks can be saved when a directory-level XOR RAID is implemented instead of a file-level XOR RAID.

Figure 6:
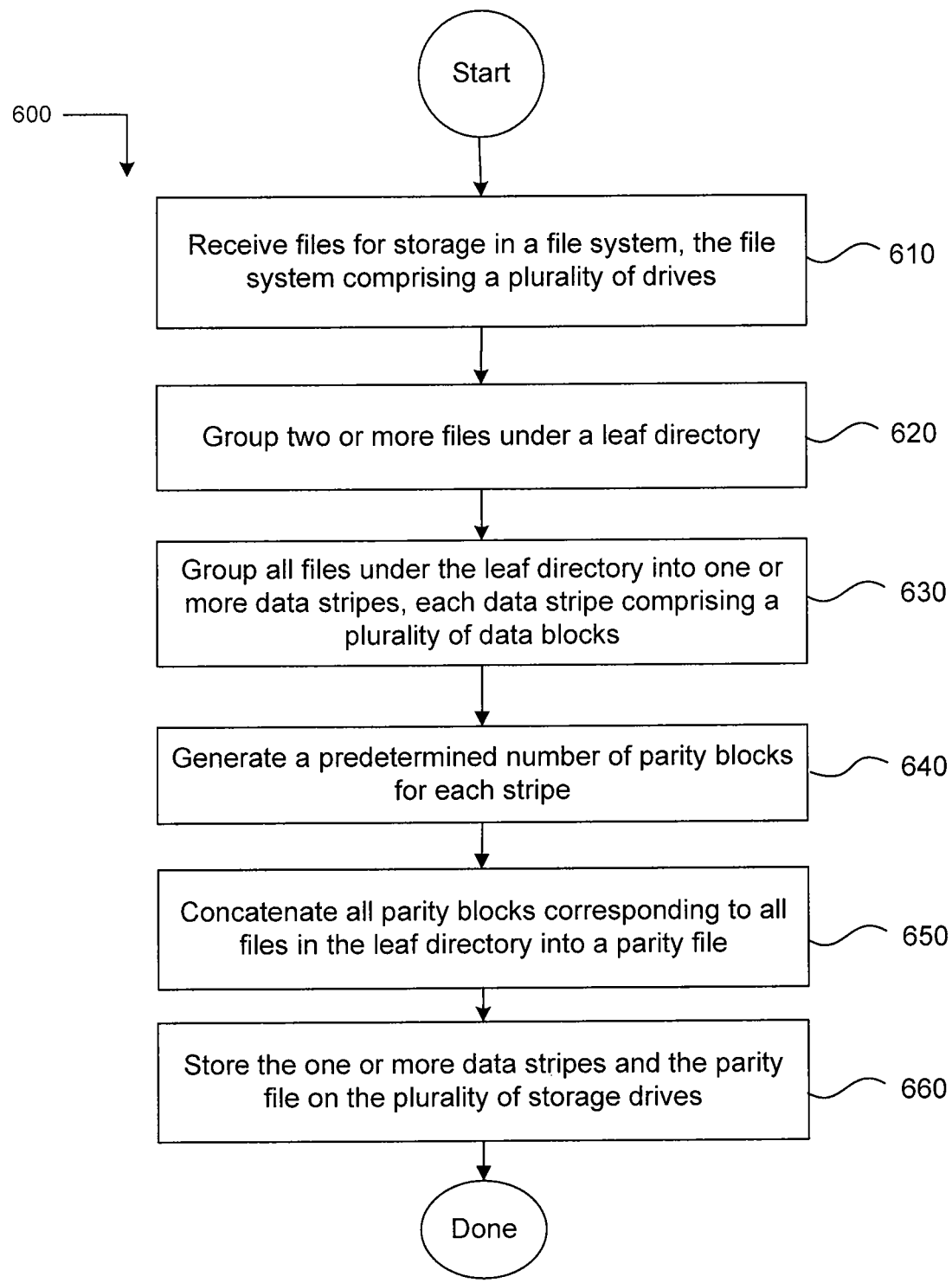
FIG. 6 illustrates a flow chart showing a set of operations 600 that may be used for directory-level RAID in a social networking system with which some embodiments of the present disclosure may be utilized.

FIG. 6 illustrates a flow chart showing a set of operations 600 that may be used for directory-level RAID in a social networking system, in accordance with some embodiments of the present disclosure. The operations illustrated in FIG. 6 may be performed in various embodiments by API request server 205, web server 210, action logger 225, message server 215 and access management system 150 associated with RAID controller 260. At step 610, files for storage in database 135 may be received from other modules and/or servers in the social network system. The database 135 may comprise a plurality of storage devices. In some embodiments, access frequency of each file may be monitored and recorded. For example, files having access frequency below a predetermined level may be grouped together for directory-level RAID.

At step 620, selected files or all received files may be grouped together under a leaf directory. In some embodiments, a non-leaf directory is implemented to group selected files or all received files for RAID process. At step 630, all files under the leaf directory are grouped into one or more data stripes. Each data stripe may consist of a plurality of data blocks (i.e., 10 data blocks) with the same or different sizes of data. At step 640, for each data stripe, a predetermined number of parity blocks are generated. All parity blocks corresponding to the two or more files are then concatenated into one parity file, at step 650. At step 660, the data blocks and parity blocks corresponding to the two or more files in the leaf directory are written to separate partitions and/or separate storage drives of the database 135.

While the method 600 of FIG. 6 is described in the context of a single database, the present disclosure contemplates a plurality of synchronous databases. The plurality of synchronous databases can be located at a single location or a variety of locations.

Figure 7:
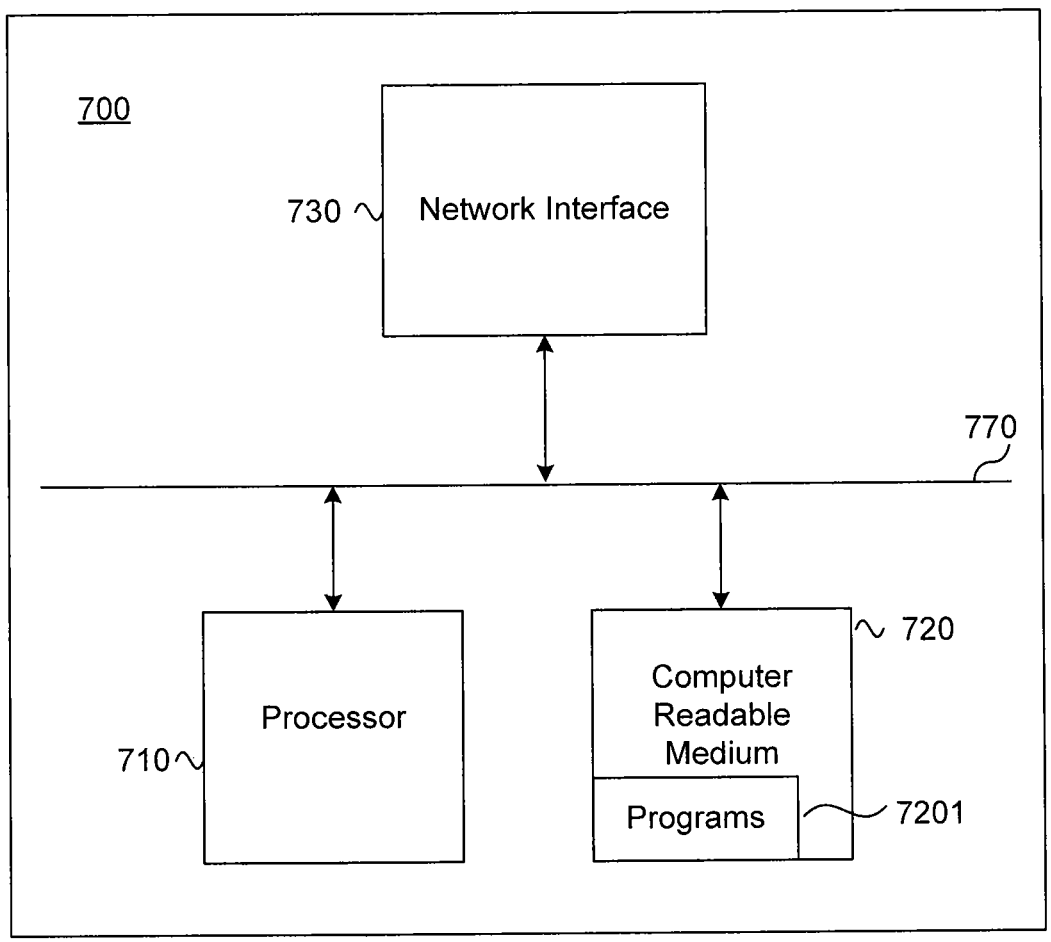
FIG. 7 illustrates an example of a computer system with which some embodiments of the present disclosure may be utilized.

FIG. 7 illustrates a diagram of a computer system 700, in accordance with yet another embodiment of the present disclosure. The computer system 700 may include at least one processor 710, one or more network interface 730 and one or more computer readable medium 720, all interconnected via one or more bus 770. In FIG. 7, various components are omitted for illustrative simplicity. The computer system 700 is intended to illustrate a device on which any other components described in this specification (i.e., any of the components depicted in FIGS. 1-4) can be implemented.

The computer system 700 may take a variety of physical forms. By way of examples, the computer system 700 may be a desktop computer, a laptop computer, a personal digital assistant (PDA), a portable computer, a tablet PC, a wearable computer, an interactive kiosk, a mobile phone, a server, a mainframe computer, a mesh-connected computer, a single-board computer (SBC) (i.e., a BeagleBoard, a PC-on-a-stick, a Cubieboard, a CuBox, a Gooseberry, a Hawkboard, a Mbed, a OmapZoom, a Origenboard, a Pandaboard, a Pandora, a Rascal, a Raspberry Pi, a SheevaPlug, a Trim-Slice, etc.), an embedded computer system, or a combination of two or more of these. Where appropriate, the computer system 700 may include one or more computer systems 700, be unitary or distributed, span multiple locations, span multiple machines, or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The computer system 700 preferably may include an operating system such as, but not limited to, Windows®, Linux® or Unix®. The operating system may include a file management system, which organizes and keeps track of files. In some embodiments, a separate file management system may be provided. The separate file management can interact smoothly with the operating system and provide enhanced and/or more features, such as improved backup procedures and/or stricter file protection.

The at least one processor 710 may be any suitable processor. The type of the at least one processor 710 may comprise one or more from a group comprising a central processing unit (CPU), a microprocessor, a graphics processing unit (GPU), a physics processing unit (PPU), a digital signal processor, a network processor, a front end processor, a data processor, a word processor and an audio processor.

The one or more bus 770 is configured to couple components of the computer system 700 to each other. As an example and not by way of limitation, the one or more bus 770 may include a graphics bus (i.e., an Accelerated Graphics Port (AGP)), an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Although the present disclosure describes and illustrates a particular bus, this disclosure contemplates any suitable bus or interconnects.

The one or more network interface 730 may include one or more of a modem or network interface. It will be appreciated that a modem or network interface can be considered to be part of the computer system 700. The interface can include an analog modem, an asymmetric digital subscribe line (ADSL) modem, a cable modem, a doubleway satellite modem, a power line modem, a token ring interface, a Cambridge ring interface, a satellite transmission interface or any suitable interface for coupling a computer system to other computer systems. The interface can include one or more input and/or output devices. The I/O devices can include, by way of example but not limitation, a keyboard, a mouse or other pointing device, disk drives, printers, a scanner, a touch screen, a Tablet screen, and other input and/or output devices, including a display device. The display device can include, by way of example but not limitation, a cathode ray tube (CRT) display, a liquid crystal display (LCD), a 3-D display, or some other applicable known or convenient display device. For simplicity, it is assumed that controllers of any devices not depicted in the example of FIG. 7 reside in the interface.

The computer readable medium 720 may include any medium device that is accessible by the processor 710. As an example and not by way of limitation, the computer readable medium 720 may include volatile memory (i.e., a random access memory (RAM), a dynamic RAM (DRAM), and/or a static RAM (SRAM)) and non-volatile memory (i.e., a flash memory, a read-only memory (ROM), a programmable ROM (PROM), an erasable programmable ROM (EPROM), and/or an electrically erasable programmable ROM (EEPROM)). When appropriate, the volatile memory and/or non-volatile memory may be single-ported or multiple-ported memory. This disclosure contemplates any suitable memory. In some embodiments, the computer readable medium 720 may include a semiconductor-based or other integrated circuit (IC) (i.e., a field-programmable gate array (FPGA) or an application-specific IC (ASIC)), a hard disk, an HDD, a hybrid hard drive (HHD), an optical disc (i.e., a CD-ROM, or a digital versatile disk (DVD)), an optical disc drive (ODD), a magneto-optical disc, a magneto-optical drive, a floppy disk, a floppy disk drive (FDD), a magnetic tape, a holographic storage medium, a solid-state drive (SSD), a secure digital (SD) card, a SD drive, or another suitable computer-readable storage medium or a combination of two or more of these, where appropriate. The computer readable medium 720 may be volatile, non-volatile, or a combination of volatile and non-volatile, where appropriate.

Programs 7201 may be stored on the one or more computer readable media 720. As an example, but not by way of limitation, the computer system 700 may load the programs 7201 to an appropriate location on the one or more compute readable media 720 for execution. The programs 7201, when executed, may cause the computer system 700 to perform one or more operations or one or more methods described or illustrated herein. In some implementations, the operations may include, but are not limited to, receiving files for storage in a database storage system that has a plurality of storage devices; grouping two or more files under a leaf directory; grouping all data under the leaf directory into one or more data stripes, in which each stripe comprises a plurality of data blocks; generating one or more parity blocks for each data stripe according to a computing algorithm; concatenating all parity blocks corresponding to the two or more files into one parity file; and storing data blocks of the two or more files in the leaf directory and the corresponding parity blocks into separate partitions and/or separate storage drives of the database storage system.

As will be appreciated by one of ordinary skill in the art, the operations or methods may be instantiated locally (i.e., on one local computer system) and may be distributed across remote computer systems. For example, it may be determined that the available computing power of the local computer system is insufficient or that additional computing power is needed, and may offload certain aspects of the operations to the cloud.

While the computer-readable medium is shown in an embodiment to be a single medium, the term "computer-readable medium" should be taken to include single medium or multiple media (e.g., a centralized or distributed database, and/or associated caches and servers) that stores the one or more sets of instructions. The term "computer-readable medium" shall also be taken to include any medium that is capable of storing, encoding or carrying a set of instructions for execution by the computer and that cause the computer to perform any one or more of the methodologies of the presently disclosed technique and innovation.

Further examples of computer-readable medium, machine-readable storage medium, machine-readable medium or computer-readable (storage) medium include but are not limited to recordable type medium such as volatile and non-volatile memory devices, floppy and other removable disks, hard disk drives, optical disks, Digital Versatile Disks, among others and transmission type medium such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The computer may be, but is not limited to, a server computer, a client computer, a personal computer (PC), a tablet PC, a laptop computer, a set-top box (STB), a personal digital assistant (PDA), a cellular telephone, an iPhone®, an iPad®, a processor, a telephone, a web appliance, a network router, switch or bridge, or any machine capable of executing a set of instructions (sequential or otherwise) that specify actions to be taken by that machine.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In general, the routines executed to implement the embodiments of the disclosure may be implemented as part of an operating system or a specific application, component, program, object, module or sequence of instructions referred to as "programs." The programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, various embodiments are capable of being distributed as a program product in a variety of forms, and that the disclosure applies equally regardless of the particular type of computer-readable medium used to actually effect the distribution.

Unless the context clearly requires otherwise, throughout the description and the claims, the words "comprise," "comprising," and the like are to be construed in an inclusive sense, as opposed to an exclusive or exhaustive sense; that is to say, in the sense of "including, but is not limited to." As used herein, the terms "connected," "coupled," or any variant thereof, means any connection or coupling, either direct or indirect, between two or more elements; the coupling of connection between the elements can be physical, logical or a combination thereof. Additionally, the words "herein," "above," "below" and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all the following interpretations of the word, any of the items in the list, all of the items in the list and any combination of the items in the list.

The above detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further, any specific numbers noted herein are only examples—alternative implementations may employ differing values or ranges.

The teaching of the disclosure provided herein can be applied to other systems and not necessarily to the system described above. Any patents and applications and other references noted above, including any that may be listed in accompanying filing papers, are incorporated herein by reference. Aspects of the disclosure can be modified if necessary to employ the systems, functions and concepts of the various references described above to provide yet further embodiments of the disclosure.

Any patents and applications and other references noted above, including any that may be listed in accompanying filing papers, are incorporated herein by reference. Aspects of the disclosure can be modified if necessary to employ the systems, functions, and concepts of the various references described above to provide yet further embodiments of the disclosure.

These and other changes can be made to the disclosure in light of the above Detailed Description. While the above description describes certain embodiments of the disclosure and describes the best mode contemplated, no matter how detailed the above appears in text, the teachings can be practiced in many ways. Details of the system may vary considerably in its implementation details while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally or logically, are understood to be implemented by computer programs or equivalent electrical circuits, microcode or the like. Furthermore, it has also proven convenient at times to refer to these arrangements of operations as modules, without loss of generality. The described operations and their associated modules may be embodied in software, firmware, hardware or any combinations thereof.

Any of the steps, operations or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations or processes described.

Embodiments of the invention may also relate to an apparatus for performing the operations herein. This apparatus may be specially constructed for the required purposes, and/ or it may comprise a general-purpose computing device selectively activated or reconfigured by a computer program stored in the computer. Such a computer program may be stored in a non-transitory, tangible computer-readable storage medium, or any type of medium suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer-readable storage medium and may include any embodiment of a computer program product or other data combination described herein.

What is claimed is:

1. A method comprising:
   receiving files for storage in a file system; the file system comprising a plurality of storage devices;
   grouping two or more files under a leaf directory;
   grouping the two or more files into a set of data blocks corresponding to the two or more files;
   grouping the set of data blocks into one or more data stripes, wherein each stripe comprises a plurality of data blocks;
   generating one or more parity blocks for each data stripe according to a computing algorithm;
   concatenating all parity blocks corresponding to the two or more files into a parity file; and
   storing data blocks of the leaf directory and the corresponding parity file into separate partitions and/or separate drives of the plurality of storage drives.

2. The method of claim 1, further comprising: replicating the data blocks and the parity blocks one or more times by writing to separate partitions and/or separate storage drives of the file system.

3. The method of claim 1, wherein the two or more files in the leaf directory are grouped in different levels according to access frequency or how recently the files were accessed.

4. The method of claim 1, wherein the computing algorithm is an XOR code or an RS code.

5. The method of claim 4, wherein the number of parity blocks corresponding to each data stripe is predetermined.

6. The method of claim 5, wherein data blocks in the plurality of data blocks of a specific data stripe have the same size of data.

7. The method of claim 6, wherein the size of each parity block corresponding to the specific data stripe is the maximum size of data blocks in the specific data stripe.

8. The method of claim 1, further comprising:
   when a specific data block of a data stripe is missing or corrupted, locating the one or more parity blocks corresponding to the specific data stripe; and
   computing the specific data block according to the remaining data blocks in the specific data stripe and the one or more corresponding parity blocks.

9. The method of claim 8, further comprising:
   calculating an original checksum when generating parity blocks for the two or more files under the leaf directory;
   calculating a second checksum after the specific data block is computed;
   comparing the original checksum and the second checksum; and
   storing the computed specific data block to the plurality of storage devices only if the value of the second checksum matches that of the original checksum.

10. The method of claim 1, further comprising:
    when a specific parity block is missing or corrupted, locating the specific data stripe corresponding to the specific parity block and the remaining one or more parity blocks corresponding to the specific data stripe; and
    computing the specific parity block according to the data blocks of the specific data stripe and the remaining one or more parity blocks.

11. A database storage system comprising:
    a computer system; and
    an application program instantiated on the computer system, wherein the application provides computer-generated output;
    wherein the computer system is configured to:
        receive files for storage in a file system, the file system comprising a plurality of storage devices;
        group two or more files under a leaf directory;
        group the two or more files into a set of data blocks corresponding to the two or more files;
        group the set of data blocks into one or more data stripes, wherein each stripe comprises a plurality of data blocks;
        generate one or more parity blocks for each data stripe according to a computing algorithm;
        concatenate all parity blocks corresponding to the two or more files into a parity file; and
        store data blocks of the leaf directory and the corresponding parity file into separate partitions and/or separate drives of the plurality of storage drives.

12. The database storage system as recited in claim 11, wherein the computer system is configured to replicate the data blocks and the parity blocks one or more times by writing to separate partitions and/or separate storage drives of the database storage system.

13. The database storage system s recited in claim 11, wherein the two or more files in the leaf directory are grouped in different levels according to access frequency or how recently the files were accessed.

14. The database storage system as recited in claim 11, wherein the computing algorithm is an XOR code or an RS code, and the number of parity blocks corresponding to each data stripe is predetermined.

15. The database storage system as recited in claim 14, wherein data blocks in the plurality of data blocks of a specific data stripe have the same size of data.

16. The database storage system as recited in claim 15, wherein the size of parity blocks corresponding to the specific data stripe is the maximum size of data blocks in the specific data stripe.

17. The database storage system as recited in claim 11, wherein, when a specific data block is missing or corrupted, the computer system is configured to:
    locate the one or more parity blocks corresponding to the specific data stripe; and
    compute the specific data block according to the remaining data blocks in the specific data stripe and the one or more corresponding parity blocks.

18. The database storage system as recited in claim 17, wherein the computer system is configured to:
    calculate an original checksum when generating parity blocks for the two or more files under the leaf directory;
    calculate a second checksum after the specific data block is computed;
    compare the original checksum and the second checksum; and write the computed specific data block to the plurality of storage devices only if the value of the second checksum matches that of the original checksum.

19. A method comprising:

receiving files for storage in a database storage system; the database storage system comprising a plurality of storage devices;

determining access frequency of the files;

grouping two or more files under a leaf directory, the two or more files having access frequencies below a predetermined level;

grouping the two or more files into a set of data blocks corresponding to the two or more files;

grouping the set of data blocks into one or more data stripes, wherein each stripe comprises a plurality of data blocks;

generating one or more parity blocks for each data stripe according to a computing algorithm;

concatenating all parity blocks corresponding to the one or more data stripes into a parity file; and storing data blocks and parity blocks corresponding to the two or more files into separate partitions and/or separate storage drives of the database storage system.

20. The method of claim 19, further comprising:

calculating an original checksum when generating parity blocks for the two or more files under the leaf directory;

when a specific data block of a data stripe is missing or corrupted, locating the one or more parity blocks corresponding to the specific data stripe;

computing the specific data block according to the remaining data blocks in the specific data stripe and the one or more corresponding parity blocks;

calculating a second checksum after the specific data block is computed;

comparing the original checksum and the second checksum; and storing the computed specific data block to the plurality of storage devices only if the value of the second checksum matches that of the original checksum.

* * * * *